United States Patent
Vessel et al.

[15] 3,664,132
[45] May 23, 1972

[54] HYPERGOLIC PROPELLANT SYSTEMS USING TETRAFORMALTRISAZINE

[72] Inventors: Eugene D. Vessel; Robert W. Ebeling, Jr., both of Santa Clara, Calif.

[73] Assignee: United Aircraft Corporation, East Hartford, Conn.

[22] Filed: Feb. 14, 1966

[21] Appl. No.: 527,099

[52] U.S. Cl. .................................. 60/220, 149/36, 149/74, 60/219
[51] Int. Cl. ........................................................ C06d 5/10
[58] Field of Search .................... 149/36, 74; 60/219, 228

[56] References Cited

UNITED STATES PATENTS

| | | | |
|---|---|---|---|
| 3,202,659 | 8/1965 | Wright | 149/36 X |
| 3,234,729 | 2/1966 | Altman et al. | 60/220 |
| 3,244,702 | 4/1966 | Marcus | 149/36 X |

*Primary Examiner*—Benjamin R. Padgett
*Attorney*—Steven F. Stone

[57] ABSTRACT

Tetraformaltrisazine is hypergolic with respect to concentrated nitric acid and this fuel oxidizer combination is usable in hybrid combustion systems.

3 Claims, No Drawings

HYPERGOLIC PROPELLANT SYSTEMS USING TETRAFORMALTRISAZINE

This application is related to the copending coassigned U.S. Pat. application of Eugene D. Vessel, Ser. No. 523,976, filed Feb. 1, 1966, for Hybrid Rocket Fuel Component.

BACKGROUND OF THE INVENTION

This invention relates to systems capable of producing hypergolic combustion and more particularly to a system employing a solid fuel material and nitric acid as the oxidizer. As used herein, the term nitric acid refers to the commercially available concentrated nitric acid which is approximately a 68 percent aqueous solution as well as concentrated nitric acid containing dissolved oxides of nitrogen described as red fuming nitric acid (RFNA) and also more highly concentrated nitric acid compositions.

Nitric acid, particularly red fuming nitric acid, is a commercially available, inexpensive oxidizing agent which is commonly used in liquid fuel rocket propulsion systems with such liquid fuels as kerosene, alcohol and hydrazine. The material has quite attractive properties for military applications since it is cheap, storable and is fairly easy to handle in the field.

As a general rule, liquid propellant rocket engines are more complex and susceptible to failure than hybrid propellant engines and it would be desirable, particularly in military applications, to utilize a hybrid propellant engine for missions now using liquid fuels. However, great difficulty has been encountered in developing a hybrid fuel system that is hypergolic with respect to nitric acid, and current systems using nitric acid employ auxiliary ignition systems.

This invention provides a fuel system that is hypergolic with respect to nitric acid and is usable not only in hybrid rocket propulsion systems but also has utility in more general applications such as the generation of heat, light or hot gases.

It is, therefore, an object of this invention to provide a hypergolic combustion system employing a solid fuel and nitric acid as an oxidizer.

It is another object of this invention to employ a solid fuel material containing tetraformaltrisazine, hereinafter referred to as TFTA, in combination with nitric acid to produce hypergolic combustion.

These and other objects of this invention will be readily apparent from the following description.

DESCRIPTION OF THE INVENTION

TFTA has the following structural formula

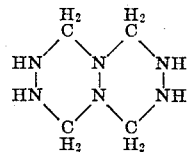

The material is readily prepared by reaction of formaldehyde and hydrazine as follows:

The synthesis of TFTA is reported by R. Stole, BER 40, 1505, (1907) and K. Hauffman et al., BER 45, 1728, (1912).

The following example is illustrative of the preparation of TFTA:

EXAMPLE 1

487 grams of a 37 percent solution of formaldehyde in water was added dropwise to 200 grams of a 75 percent solution of hydrazine in water over a period of 4½ hours. The reaction mixture was maintained at 50°C. Solid TFTA separated upon cooling of the mixture.

According to this invention, TFTA, itself, can be employed as the solid fuel material in which case it is pressed into the desired shape. If necessary, a small amount of a particulate solid binder such as polyethylene or polypropylene can be incorporated to improve the physical characteristics of the pressed grain. TFTA can also be incorporated in conventional hybrid fuel formulations which may include conventional elastomeric binders such as polybutadiene base polymers, polyether polymers and epoxy polymers, for example; flame temperature modifiers such as powdered metallic aluminum, boron, magnesium and alkali metals, for example; burning rate controllers such as ferric oxide and ferrocene compounds, for example; and solid oxidizers such as ammonium perchlorate and ammonium nitrate, for example.

Since TFTA is a more energetic fuel than the polymeric binders, it is desirable to include as much TFTA as possible in the solid fuel material. Since the hypergolic character of the fuel with respect to nitric acid depends not only on the amount of TFTA present, but also on the nature of the other components in the mixture, and the physical environment in which it is used, it is not possible to set a specific lower limit to the amount of TFTA that is required to produce hypergolic combustion with TFTA. Although experimental results indicate that this lower limit lies in the range between 30–40 percent by weight of TFTA, it is possible that even lower amounts of TFTA can produce hypergolic combustion with nitric acid in combustion chambers properly designed to reduce heat losses from the fuel. In any event, these lower limits are well below the level of TFTA that can be readily incorporated in the fuel and therefore no substantial problem exists in incorporating sufficient TFTA in the fuel to produce hypergolic combustion with nitric acid. The following examples are illustrative of this invention:

EXAMPLE 2

Red fuming nitric acid was added dropwise to powdered TFTA. Decomposition followed by ignition and combustion occurred. Further addition of RFNA failed to extinguish the combustion, indicating good resistance to oxidizer flooding.

EXAMPLE 3

Liquid $N_2O_4$, a more powerful oxidizer than nitric acid was added dropwise to powdered TFTA. Decomposition and smoke was observed but no ignition occurred even with increased rates of $N_2O_4$ addition. Apparently, the hypergolic property of TFTA with nitric acid is dependent on some characteristic of nitric acid other than its strength as an oxidizer.

EXAMPLE 4

Solid fuel samples having the following compositions were prepared:

| | % by wt. A | % by wt. B | % by wt. C | % by wt. D |
|---|---|---|---|---|
| Hydroxyl terminated polybutadiene cured with toluene diisocyanate | 80 | 70 | 60 | 50 |
| TFTA | 20 | 30 | 40 | 50 |

Nitric acid was added dropwise to the samples. Hypergolic combustion occurred with samples C and D, but no combustion was observed with samples A and B.

EXAMPLE 5

A fuel sample was prepared having the following composition:

| | | % by weight |
|---|---|---|
| ERL 2795 epoxy resin | | 50 |
| Oxiron 2001 | epoxy modified polybutadiene | 12.5 |
| TFTA | | 37.5 |

Hypergolic combustion was observed upon dropwise addition of nitric acid.

While this invention has been described with respect to several specific embodiments, the invention should not be construed as being limited thereto. Various modifications and substitutions can be made without departing from the scope of the invention which is limited only by the following claims:

We claim:

1. A method of producing combustion which comprises contacting a fuel material comprising tetraformaltrisazine with nitric acid, said tetraformaltrisazine being present in said fuel material in an amount sufficient to produce hypergolic ignition.

2. The process of claim 1 wherein said tetraformaltrisazine comprises at least about 30 percent by weight of said fuel material.

3. The process of claim 1 wherein said nitric acid is red fuming nitric acid.

* * * * *